United States Patent [19]

Seigel

[11] 3,876,930
[45] Apr. 8, 1975

[54] INDUCED POLARIZATION METHOD FOR GEOPHYSICAL PROSPECTING

[76] Inventor: Harold Oscar Seigel, 9 Ox Bow Rd., Don Mills, Ontario, Canada M3B 1Z9

[22] Filed: Apr. 15, 1974

[21] Appl. No.: 461,002

Related U.S. Application Data

[63] Continuation-in-part of Ser. No. 339,170, March 8, 1973, abandoned, and a continuation-in-part of Ser. No. 194,155, Nov. 1, 1971, abandoned, and a continuation-in-part of Ser. No. 91,877, Nov. 23, 1973, abandoned.

[52] U.S. Cl. .......................................... 324/1; 324/6
[51] Int. Cl. .......................... G01v 3/06; G01v 3/08
[58] Field of Search ............................... 324/1, 3–9, 324/85

[56] References Cited
UNITED STATES PATENTS

| | | | |
|---|---|---|---|
| 2,735,980 | 2/1956 | Wait | 324/7 |
| 2,900,595 | 8/1959 | Mengel et al. | 324/4 X |
| 2,988,690 | 6/1961 | Love et al. | 324/1 |
| 3,210,652 | 10/1965 | Seigel | 324/1 |
| 3,299,351 | 1/1967 | Williams | 324/85 X |
| 3,422,345 | 1/1969 | Muse | 324/8 X |
| 3,525,037 | 8/1970 | Madden et al. | 324/7 |
| 3,594,633 | 7/1971 | Barringer | 324/6 |

*Primary Examiner*—Gerard R. Strecker
*Attorney, Agent, or Firm*—Fetherstonhaugh & Co.

[57] ABSTRACT

This application concerns a method and apparatus for geophysical prospecting wherein one creates a polarized condition in the medium being explored by conductively passing a primary electric current of repetitive wave form through the medium, this wave form containing a fundamental and at least one harmonically related constituent of odd order, phase synchronized with said fundamental, detecting a field component and filtering each constituent from it, frequency multiplying these constituents to produce signals of a common frequency and comparing the relative phase of these signals, whereby to achieve a reliable indication of an anomalous polarizable condition in the earth while automatically suppressing electromagnetic induction effects in the earth.

3 Claims, 9 Drawing Figures fo 2 fo 3 fo

INDUCED POLARIZATION METHOD FOR GEOPHYSICAL PROSPECTING

This invention relates to improvements in the making of induced polarization measurements utilizing magnetic field detection devices and is a continuation-in-part of application Ser. No. 339,170, filed Mar. 8, 1973; and application Ser. No. 194,155, filed Nov. 1, 1973; and application Ser. No. 91,877 filed Nov. 23, 1970 all now abandoned. More particularly, it relates to methods wherein magnetic field induced polarization measurements are made by measuring the relative phase of a magnetic field due to current flow in the medium without the necessity of transmitting by radio a phase reference.

The induced polarization method of geophysical exploration has come to be widely accepted and used in the search for metallic conducting minerals since the original thesis herein by Harold O. Seigel in 1949.

In its broadest aspect, this invention is a method of prospecting comprising the steps of creating a polarized condition in the medium being explored by conductively passing a primary electric current of repetitive wave form through the medium, said wave form containing at least two odd harmonically related, phase synchronized constituents, at least one of such constituents having a frequency in the active induced polarization range, detecting a field component due to said electric current, separately filtering said two constituents from said field component, transforming each of said filtered constituents to a common frequency and comparing the relative phase shift of the common frequency signals whereby to obtain an indication of induced polarization effects in the medium.

The invention will be clearly understood after reference to the following detailed specification read in conjunction with the drawings.

IN THE DRAWINGS

The induced polarization technique employed herein is known as the "Frequency Domain" method and entails the passage of sine wave form currents of low frequencies through the ground. Since polarization effects take an appreciable time to build up it can be seen that as the frequency is decreased the apparent resistivities or transfer impedances between the current and measuring circuits will increase.

Figure 1:
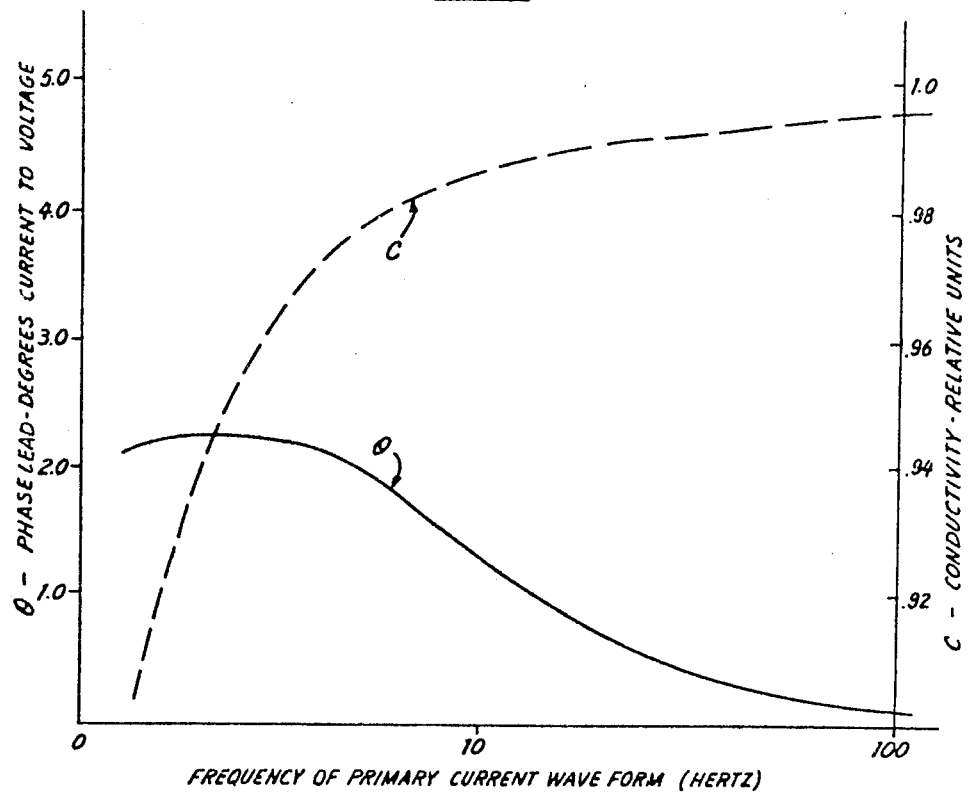
FIG. 1 shows an apparent conductivity and phase angle curve for a moderately polarizable geological material.

FIG. 1 shows typical curves of apparent conductivity and phase angle (i.e., the "complex admittance") of moderately polarizable geologic materials, plotted with respect to the fundamental frequency of the applied repetitive current form. Both the fact of the variation of apparent conductivity with frequency and the presence of phase angle leads or lags are indicative of the presence of induced polarization effects.

The frequency domain method commonly used to date entails a comparison of apparent resistivities using sinusoidal alternating current of two or more frequencies, generally within the range of 1/10 to 10 hertz. The induced polarization factor measured is the "Percent Frequency Effect" or P.F.E. which is defined as $R_1 - R_2/R_1 \times 100$ where $R_1$ and $R_2$ are the apparent resistivities at the lower and higher frequencies respectively (e.g., 0.5 and 5 hertz).

Whereas it has been common practice to measure electric fields as indicative of induced polarization effects it was theoretically shown in the writer's earlier patent (U.S. Pat. No. 3,210,652) that magnetic field measurements also enable us to measure such effects. In particular, the phase angle of magnetic fields due to current flow in the ground could be used to derive equivalent induced polarization information.

Figure 2:
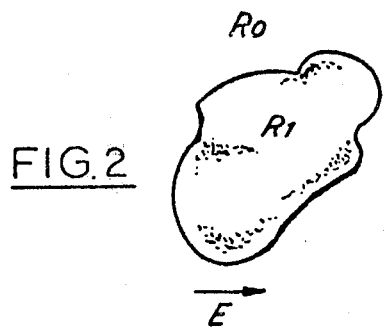
FIG. 2 shows a mass of highly polarizable material being subjected to current passage in the ground.

For a better understanding of the invention, an equivalent circuit analogy to a simple geologic example will be used. FIG. 2 shows a mass of highly polarizable material in the earth through which current is being passed under the action of the applied electric field E. In the generalized way the impedance of this mass to the flow of current may be represented by a quantity $R_1$ which is both complex and a function of frequency (e.g., as shown in reciprocal form in FIG. 1). The exterior medium (i.e., the general mass of the country rock enclosing the highly polarizable material) is considered to be of low polarization and, therefore, its impedance, represented by Ro, is largely real and largely unaffected by the frequency of the applied field.

Figure 3:
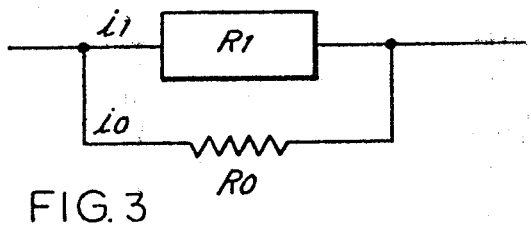
FIG. 3 shows an equivalent circuit representation of the configuration of FIG. 2.

FIG. 3 shows the same picture in a simple equivalent circuit form with $R_1$ being a complex function, reducing in absolute value with increasing frequency and Ro being a constant real quantity. If we compare the current $i_1$ flowing through the mass $R_1$ with the current $i_o$ in the external circuit Ro, as a function of frequency, we will find curves of amplitude ratio and phase shift as per FIG. 4. With respect to $i_o$ therefore, we see that $i_1$ is distinguished in having (a) a phase lead relative to $i_o$ (b) a phase lead which decreases progressively as the frequency is increased (beyond a certain low frequency) and (c) a progressive increase in amplitude with increasing frequency, to an asymptotic value.

The alternating magnetic field Hp at any point P due to current flow in the mass $R_1$ will have the same relationship of amplitude and phase versus frequency as will the current $i_1$ itself. By proper means one may thus detect the presence of induced polarization effects through analysis of the appropriate magnetic field measurements.

Figure 5:
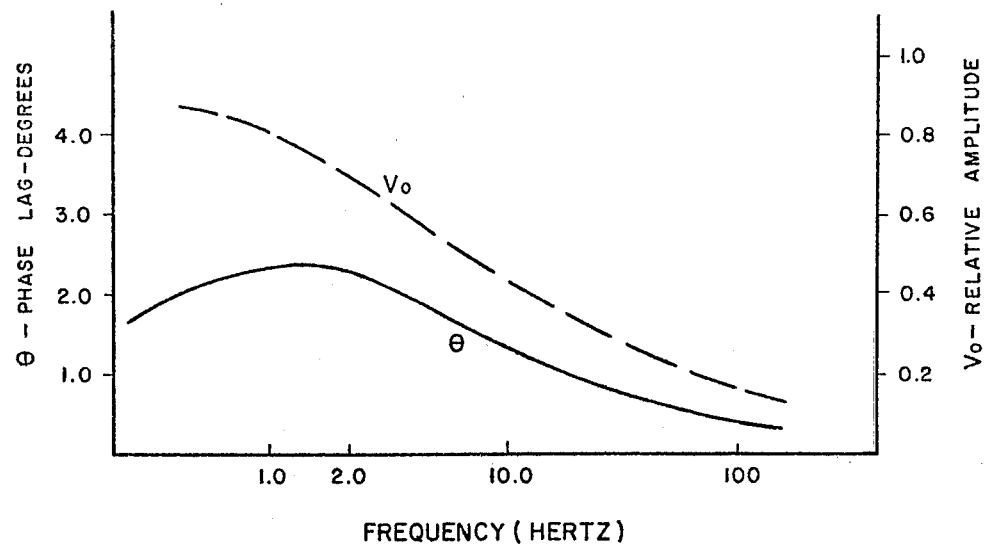
FIG. 5 shows the relative amplitude and phase angles of the voltage across the non-polarizable body.

FIG. 5 shows $V_o$ the voltage drop across the external resistance Ro, as a function of frequency. This is, in fact, the voltage that is normally measured in the electric field. IP methods, for example to derive the P.F.E. mentioned above, because Ro is in parallel with $R_1$, whose impedance varies with frequency, the current through Ro (and, therefore, $V_o$ the voltage across Ro) varies with frequency, in accordance with FIG. 5. It is to be seen there that the amplitude $V_o$ decreases progressively as the frequency is increased. Additionally $V_o$ has a phase lag with respect to the total current $i_1 + i_o$, i.e., $i_o$ lags and $i_1$ leads.

The Seigel patent (U.S. Pat. No. 3,210,652) of record above, makes reference to the measurement of the phase of a magnetic field primarily due to current flow in the ground in order to obtain a measure of the induced polarization characteristics of the ground. It is therein suggested that a radio link be established between the IP transmitter and receiver so that the phase reference may be provided for this measurement. In practice this is a major problem because of (a) radio licensing requirements and (b) reception difficulties associated with rough topography, etc. It is accordingly a primary purpose of this invention to provide means whereby induced polarization measurements involving magnetic fields may be made without the necessity of a radio link and with other auxiliary benefits. It is also an object of the invention to provide a more sensitive prospecting method.

Figure 6:
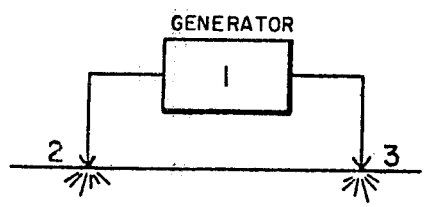
FIG. 6 is a schematic representation of a manner in which current is caused to pass through the earth to establish induced polarization effects.

In FIG. 6 numeral 1 refers to a power generator capable of producing a repetitive current wave form of frequencies in the range of 0–100 Hz. Frequencies of 1, 2, 5 and 10 and 20 Hz have, among others, been found effective at various times in detecting areas of anomalous polarization, for example zones of sulphide mineralization. The resultant wave form may have a complex form, e.g., square wave, saw tooth, etc. Adequate frequency stability may readily be obtained by using crystal-controlled oscillators whose frequencies are electronically counted down to produce the desired low frequencies. Other frequency stabilizing devices may be employed for this purpose. Whereas the above noted Seigel patent refers to the necessity of having a very harmonically clean sine wave form for the purpose the present invention employs a composite wave form with at least two odd harmonically related components.

Figure 4:
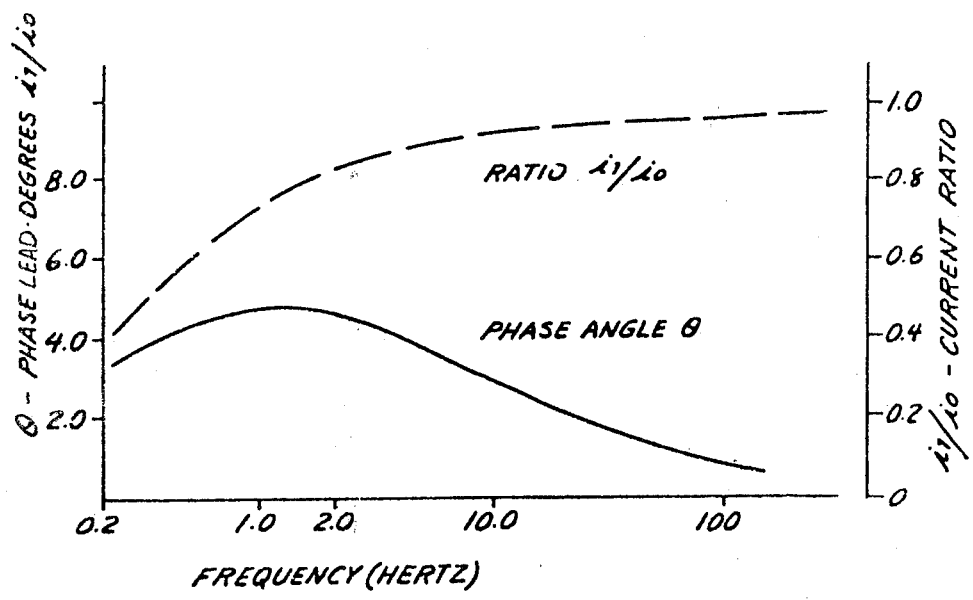
FIG. 4 shows the relative amplitudes and phase angles of the current flow through a polarizable body such as FIG. 2 as a function of frequency.

Phase measurements of a magnetic field component of current flow in the medium provide a powerful tool for the detection of the induced polarization characteristics of the medium. Such measurements avoid the necessity of maintaining constant the amplitude of the primary currents being passed into the ground and one or more frequencies. As FIG. 4 shows, the presence of a phase angle lead distinguishes local currents which are flowing in high polarization material from those that are flowing in low polarization material. One measures, therefore, the phase angle of the magnetic field component associated with ground current flow from place to place in the area to be investigated, whereby regions of high polarization are detected and mapped. Measurement of these phase angles without transmitting a reference phase is a desirable thing and methods of measuring these phase angles will be presented which give a reliable indication of polarization and in which the reference phase necessary for these measurements is provided without the onerous necessity of radio transmission of a reference phase, plus other advantages.

The current output of a repetitive wave form generator 1 is passed into the ground through the contact points 2 and 3, which are usually well-grounded metal electrodes.

Figure 7:
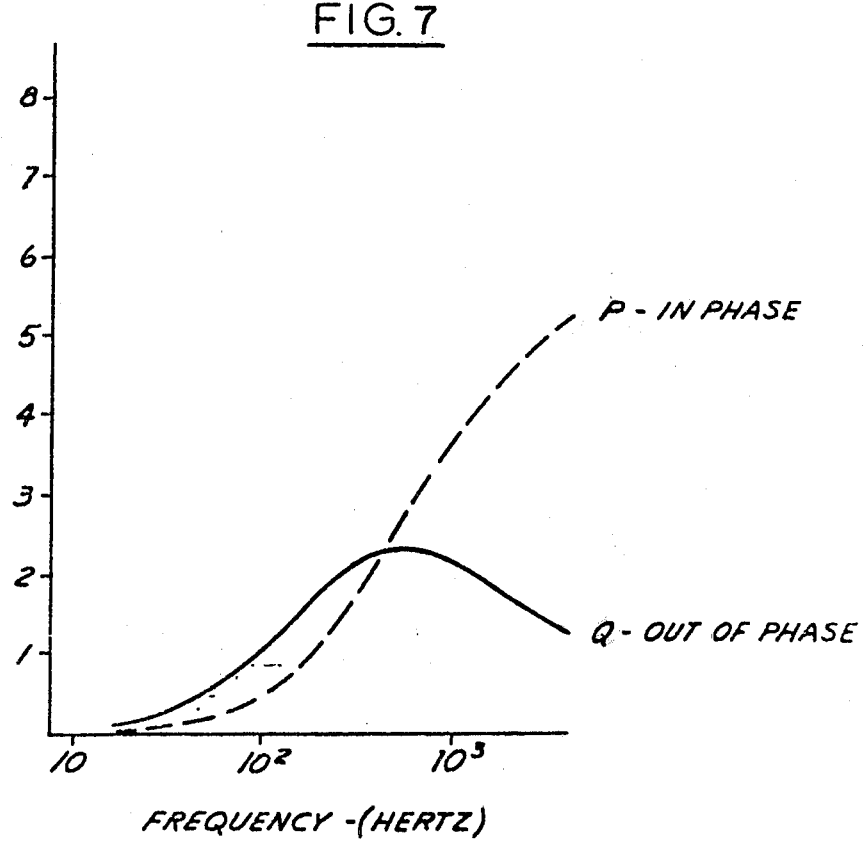
FIG. 7 illustrates the variation of electromagnetic induction response of a typical tabular conducting body in the earth as a function of primary frequency employed.

An advantage of transmitting two or more frequencies, either simultaneously or consecutively, may be seen by reference to FIGS. 1, 4 and 7. In FIGS. 1 and 4 it is seen that the phase shift due to polarization for the medium to which those curves relate may reach a maximum at a frequency below 5 Hz and decrease almost inversely as the frequency beyond about 5 Hz. On the other hand, FIG. 7 shows the variation with frequency of the inductive electromagnetic response of a typical tabular conducting body of large lateral dimensions, e.g., conducting overburden or a conducting shear zone. The body shown has a conductivity-thickness of 10 mhos—which is a rather high by geologic standards. Even for this body, at frequencies of 100 Hz or less it may be seen that the in-phase component is negligible in relation to the out-of-phase component and will hardly affect the magnetic field amplitude. In addition, the out-of-phase component increases almost linearly with frequency at these low frequencies, a characteristic which clearly separates it from phase shifts due to induced polarization effects. Thus, any magnetic detection system which provides phase shift information on magnetic fields associated with current flow in the earth at two or more low and properly selected frequencies can both indicate the presence of induced polarization effects and resolve these from electromagnetic induction effects.

Figure 8:
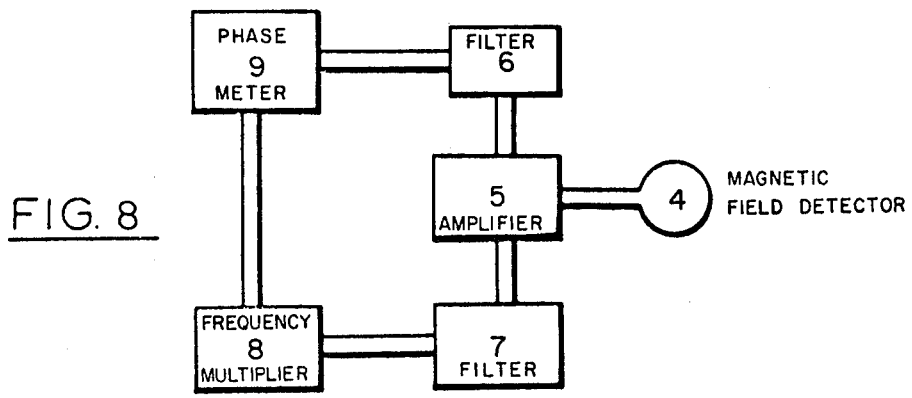
FIG. 8 shows, in block diagram form, a detecting and measuring means for the invention.

FIG. 8 shows a detector system for the invention. Numeral 4 refers to a magnetic field detector which, as before, detects the magnetic field component primarily due to current passage through the earth.

At least two frequencies $f_o$ and $f_1$ of the primary current are passed simultaneously and the frequencies are odd harmonically related and so chosen that $f_1$, the higher of the frequencies, falls on the descending portion of the phase angle—frequency curves characterized by FIGs. 1 and 4 for the type of polarizable bodies under investigation in the area in question. The lowest frequency employed, $f_o$, (the "fundamental" frequency) should be selected so as to lie within the usual broad peak of the phase angle curve. Being harmonically related, the various wave forms in the transmitted current will also be synchronized. A simple example of such a resultant wave form is a square wave, which contains all odd harmonics of the fundamental. Under the action of induced polarization effects in the medium being investigated the various frequency components will be phase shifted by differing amounts, as shown by FIGS. 1 or 4. This phenomena is utilized by the apparatus of FIG. 8 to obtain an indication of the induced polarization factors of the medium, as will be explained below.

FIG. 8 is based on the premise of two current wave forms having two odd harmonically related constituent frequencies although more than two may be employed as well.

The output of detector 4 is fed into the broad band preamplifier 5 whose output is split by filters 6 and 7 into two signals corresponding to the two odd harmonically related frequency components $f_o$ and $f_1$ of the transmitted signal, with the fundamental frequency $f_o$ component being detected by filter 7. The output of filter 7 passes to a frequency multiplier 8 which produces an output of frequency $f_1$ which is synchronized with $f_o$ in the same manner as the original $f_1$ component. If the phase of the $f_o$ component is shifted by induced polarization effects by an amount $\theta$ then that of the $f_1$ component produced in the frequency multiplier 8 will be shifted by an amount $\theta f_1/f_o$.

The phase shift in the $f_1$ field component caused by induced polarization effects, which may be denoted by $\theta_1$, is less than $\theta_o$, as was indicated above.

The two $f_1$ signals produced by items 6 and 8 are compared as to phase on a phasemeter 9. The output of this phasemeter is the phase difference ($\theta_o \times f_1/f_o - \theta_1$). Since $f_1/f_o$ is a whole number greater than or equal to 2 and since $\theta_o$ is greater than $\theta_1$, the resultant phase difference is largely related to $\theta_o$, i.e., to the phase shift caused by induced polarization effects.

There are two significant advantages of this embodiment namely (a) the magnetic signals provide their own phase reference and (b) there is an amplification, by a factor equal to the order of the harmonic employed, of the phase shift of the fundamental frequency signal, i.e., an amplification of the induced polarization effect and (c) there is an automatic cancellation of the phase angle shifts caused by electromagnetic effect (FIG. 7), for these, as previously explained will produce phase angles nearly proportional to frequency, thereby cancelling in the phase meter as described above.

Equivalent information about the relative phase shift may be obtained by measurement of quadrature components of magnetic fields, using the same phase reference, i.e., the phase synchronized second frequency magnetic field.

Moreover, two phase synchronized electric field components may be employed to derive induced polarization information, in which case the electric field would be measured by two electrodes contacting ground.

Figure 9:
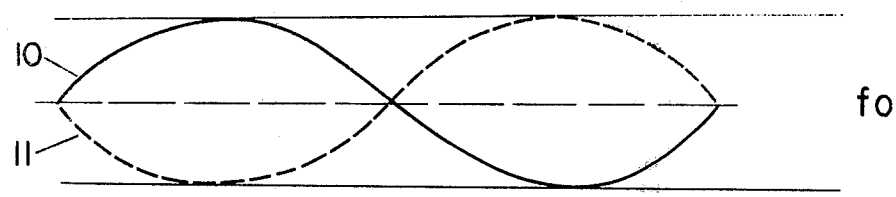
FIG. 9 is an illustration of a series of wave forms of harmonically related components illustrating the importance of using odd harmonically related constituents for the invention.
Figure 9:
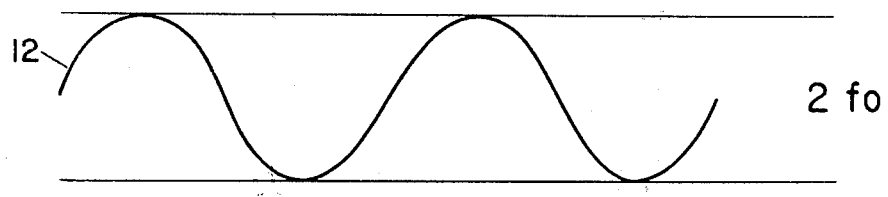
Figure 9:
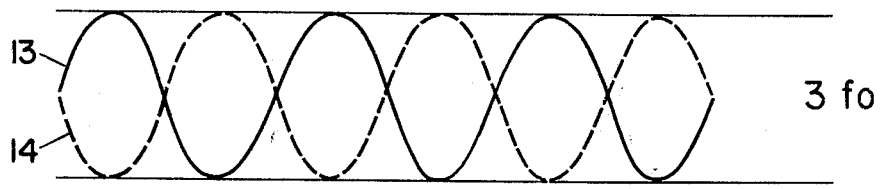

The reason why odd harmonically related phase synchronized constituents are used in this invention is shown in FIG. 9. Numeral 10 is a wave form representing the fundamental signal ($f_o$) produced by filter 6. This signal is distorted by the frequency multiplier 8 to produce a signal that can be compared in phase with that of the harmonic constituent of frequency $f_1$ which has been transmitted simultaneously with $f_o$. If $f_1$ is an even harmonic (shown here as being of order 2) we will derive the wave form shown by numeral 12.

If the fundamental signal is inverted in sense (i.e., 180° phase shift) as shown by wave form 11, the frequency doubled signal 12 will not change in sense or any other way. Similarly any even order harmonic (4, 6, 8, 10, etc.) of the fundamental will not reflect a 180° phase shift of the fundamental. Use of two even harmonically related phase synchronized constituents could always lead to a 180° error in the phase relationship between the output of the frequency multiplier 8 and the signal coming directly from the detector 4 through filter 6 due to reversal of polarity of both constituents.

If, as intended with this invention, only odd order harmonics are utilized, the possibility of error disappears. Numeral 13 in FIG. 9 refers to the form of the third harmonic produced from the fundamental 10. If the fundamental 10 should become reversed in polarity as shown by the wave form 11, then the equivalent third harmonic derived from the frequency multiplier 8 will be given by the wave form 14. This wave form is also reversed in polarity, and retains its proper phase relationship to the fundamental. It is the same for any odd harmonically related constituents.

Since the phase shifts to be measured as indicative of induced polarization effects are expected to be of the order of only a few degrees, any system which has an uncertainty of 180° cannot be tolerated. For this reason only harmonics of odd order can be used readily in this invention.

What I claim as my invention is:

1. In an induced polarization method of prospecting, the steps of creating a polarized condition in the medium being explored by conductively passing a primary electric current of repetitive wave form through the medium, said wave form containing two odd harmonically related, phase synchronized constituents, at least one of such constituents having a frequency in the active induced polarization range, detecting a field component due to said electric current, separately filtering said two odd harmonically related constituents from said field component, transforming each of said filtered constituents to a common frequency and comparing the relative phase shift of the common frequency signals whereby to obtain an indication of induced polarization effects in the medium.

2. A method of prospecting as claimed in claim 1 in which said field component is an electric field component.

3. A method of prospecting as claimed in claim 1 in which said field component is a magnetic field component.

* * * * *